United States Patent
Park et al.

(10) Patent No.: US 10,399,514 B2
(45) Date of Patent: Sep. 3, 2019

(54) LOW-MELTING ADHESIVE FILM

(71) Applicants: Hyundai Motor Company, Seoul (KR); Kia Motors Corporation, Seoul (KR); Hanmin Automotive Trim Industries, Cheongwon-gun (KR); Samsung Gratech. Co., Ltd., Hwaseong-si (KR)

(72) Inventors: Jung Min Park, Hwaseong-Si (KR); Ho Dal Lee, Suwon-Si (KR); Jong Heon Lee, Suwon-Si (KR); Eun Kyung Lee, Seoul (KR); Ki Hyun Yoo, Seoul (KR)

(73) Assignees: Hyundai Motor Company, Seoul (KR); Kia Motors Corporation, Seoul (KR); Hanmin Automotive Trim Industries, Cheongwon-gun (JP); Samsung Gratech. Co., Ltd., Hwaseong-si (KR)

( * ) Notice: Subject to any disclaimer, the term of this patent is extended or adjusted under 35 U.S.C. 154(b) by 592 days.

(21) Appl. No.: 14/541,096

(22) Filed: Nov. 13, 2014

(65) Prior Publication Data

US 2015/0183383 A1  Jul. 2, 2015

(30) Foreign Application Priority Data

Dec. 31, 2013 (KR) ......................... 10-2013-0168024

(51) Int. Cl.
*B60R 13/08* (2006.01)
*B32B 7/06* (2019.01)
(Continued)

(52) U.S. Cl.
CPC .............. *B60R 13/083* (2013.01); *B32B 7/06* (2013.01); *B32B 7/12* (2013.01); *B32B 27/065* (2013.01);
(Continued)

(58) Field of Classification Search
CPC .......... B60R 13/083; B32B 7/06; B32B 27/08
See application file for complete search history.

(56) References Cited

U.S. PATENT DOCUMENTS

2011/0112270 A1  5/2011  Meltzer
2012/0123043 A1*  5/2012  Nakamura ............... C08H 6/00
524/507

FOREIGN PATENT DOCUMENTS

JP    58180689 A   * 10/1983
JP    09-221640 A    8/1997
(Continued)

OTHER PUBLICATIONS

Derwent Abstract of JP 58-180689.*

*Primary Examiner* — Victor S Chang
(74) *Attorney, Agent, or Firm* — Morgan, Lewis & Bockius LLP

(57) ABSTRACT

A low-melting adhesive film may include a first adhesive layer made of a material comprising thermoplastic polyurethane, a second adhesive layer made of a material comprising aromatic-based hot-melt thermoplastic polyurethane capable of being applied to low temperature adhesion at a temperature of 60° C. or higher, and a polyethylene (PE)-based protective film layer. The low-melting adhesive film may be used to adhere a carpet fabric to a sound absorbing material and thus produce an integrated sound absorbing and proofing composite carpet.

11 Claims, 1 Drawing Sheet

(51) Int. Cl.
*B32B 7/12* (2006.01)
*B32B 7/08* (2019.01)
*B32B 27/40* (2006.01)
*B32B 27/06* (2006.01)
*B32B 27/12* (2006.01)
*B32B 27/20* (2006.01)
*B32B 27/32* (2006.01)
*B32B 27/08* (2006.01)

(52) U.S. Cl.
CPC .............. *B32B 27/08* (2013.01); *B32B 27/12* (2013.01); *B32B 27/20* (2013.01); *B32B 27/32* (2013.01); *B32B 27/40* (2013.01); *B32B 2264/102* (2013.01); *B32B 2264/104* (2013.01); *B32B 2266/0278* (2013.01); *B32B 2307/102* (2013.01); *B32B 2307/30* (2013.01); *B32B 2405/00* (2013.01); *B32B 2605/00* (2013.01); *Y10T 428/1405* (2015.01); *Y10T 428/1452* (2015.01)

(56) References Cited

FOREIGN PATENT DOCUMENTS

| | | |
|---|---|---|
| KR | 10-1999-0046686 A | 7/1999 |
| KR | 10-0701274 B1 | 3/2007 |
| KR | 10-0701279 B1 | 3/2007 |
| KR | 10-0842218 B1 | 6/2008 |
| KR | 10-2012-0109062 A | 10/2012 |
| WO | WO 2013/053786 A1 | 4/2013 |

* cited by examiner

LOW-MELTING ADHESIVE FILM

CROSS-REFERENCE TO RELATED APPLICATION

The present application claims priority of Korean Patent Application Number 10-2013-0168024 filed on Dec. 31, 2013, the entire contents of which application are incorporated herein for all purposes by this reference.

BACKGROUND OF INVENTION

Field of Invention

The present disclosure relates to a low-melting adhesive film including low-melting polyurethane as an adhesive layer. Since the low-melting adhesive film of the present invention exhibits excellent adhesive strength even at a low temperature when a sound absorbing material is adhered to a carpet fabric, it can be effectively used in interlay adhesion between the carpet fabric and a sound absorbing and proofing composite carpet to which a sound absorbing material is laminated.

Description of Related Art

Carpets or various sound absorbing and proofing materials have been widely used to reduce noise, vibration and harshness (NVH) of vehicles and improve vehicle interior environment.

Generally, carpets or various sound absorbing and proofing materials have a sound proofing structure made of fabrics having a variety of laminated structures, but recently, the research for the development of a sound absorbing and proofing composite material with sound absorbing properties has been intensively carried out.

In particular, the conventional carpet has a structure in which the lower part of the carpet fabric is made of a sound proofing material, and the lowest part thereof is treated with an AP (application processor) coating having a weight of 700~1200 $g/m^2$, wherein the AP coating is composed of polyethylene, elastomer, EVA and the like and includes an adhesive ingredient. The sound absorbing material, in which a polyethylene film is adhered to polyurethane foam, is then bonded to the carpet fabric. In this case, the polyethylene film is adhered to the AP coating by using adhesive strength of the AP coating rather than its own adhesive strength, to thereby manufacture a carpet with the sound absorbing material. Thus, during the conventional process of laminating the carpet fabric and sound absorbing material in the manufacture of a sound absorbing and proofing composite carpet, the carpet fabric is heated in an oven at a temperature of 180° C. or higher, the AP coating is melted due to the heating, the polyethylene film bonded to an expandable sound absorbing material is adhered to the melted AP coating layer, and then, the resulting carpet fabric is molded into a sound absorbing and proofing composite carpet through a cooling mold.

As described above, the conventional manufacturing process of a conventional sound absorbing and proofing composite carpet is complicated, and there is a need to improve durability and lightening thereof. In addition, demand for the application of a high strength material which is favorable to manufacture a sound absorbing and proofing composite carpet compared with the application of an AP coating has been increased.

On the other hand, in order to laminate polyurethane foam as a sound absorbing material to the carpet fabric, it is necessary to use an adhesive agent between them, and for this, the research for the development of an adhesive agent or an adhesive film should be accompanied.

As an adhesive film previously reported, Korean Patent No. 10-0842218 discloses a hot-melt thermoplastic polyurethane resin for an adhesive agent and a laminate film including the same, which is obtained by controlling melting points of a heat resistant thermoplastic polyurethane resin used as a protective layer for a laminate film and a hot-melt thermoplastic polyurethane resin used as an adhesive layer such that it has different melting points.

In particular, it discloses a laminate film which is characterized by manufacturing the following steps: forming an adhesive layer by using a hot-melt thermoplastic polyurethane resin which is obtained by reacting polyol (polyester diol, polyether diol) with a molecular weight of 1,500-2,500, a bifunctional chain extender and organic diisocyanate (aromatic, aliphatic, alicyclic isocyanate) and has a melting point of 80 to 140° C., forming a protective layer by using a heat resistant thermoplastic polyurethane resin which is obtained by reacting polyol (polyester diol, polyether diol), a bifunctional chain extender (butanediol) and organic diisocyanate (aromatic, aliphatic, alicyclic isocyanate) and has a melting point of 160° C. or higher and a softening point of 81° C. or higher, adhere the adhesive layer and protective layer to each other under pressure.

Also, Korean Patent Application Publication No. 2012-109062 discloses a hot-melt thermoplastic polyurethane resin for adhesion and an adhesive layer having excellent elongation, a hot-melt thermoplastic polyurethane resin for a protective layer having excellent elongation and heat resistance, and a film manufactured by using the same.

In addition, Japanese Patent Application Publication (Kokai) No. 9-221640 discloses a thermoplastic polyurethane resin having a flow initiating temperature ranging from 80 to 150° C. which is characterized by including one or more methyl side-chains within a molecule made of aliphatic diisocyanate, polyhydric diol and a chain extender, and a hot-melt film adhesive agent with excellent low temperature flexibility which is obtained by hot press forming the same. US Patent Application Publication No. 2011-112270 discloses a low-melting polyurethane elastomer obtained by reacting polyester polyol, methylene diphenyl diisocyanate (MDI), and a linear diol chain extender having 5 or 7 carbon atoms between hydroxyl (OH) groups of diols.

These adhesive films or adhesive agents used in the prior arts described above have a similar composition in the manufacture of a hot-melt thermoplastic polyurethane resin as an adhesive film and include isocyanate and diol as an adhesive polymer. However, there are problems in that they are apt to be separated due to their low adhesive strength, and their high adhesion temperature makes it difficult and complicated to manufacture them.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the above-described problems associated with prior art and/or other problems.

The present inventors have intensively studied these and/or other problems, and have found that when an adhesive film is formed to include a first adhesive layer made of thermoplastic polyurethane and a second adhesive layer made of aromatic-based hot-melt thermoplastic polyurethane which is capable of being applied to low temperature adhesion at a lowest temperature of 60° C. or higher, the thus formed adhesive film shows excellent adhesive properties at a low temperature and high adhesive strength to adjacent laminating materials, leading to easy low temperature adhesion in a manufacturing process thereof.

In various aspects, the present invention provides a low-melting adhesive film including a first adhesive layer made of a material comprising thermoplastic polyurethane, a second adhesive layer made of a material comprising aromatic-based hot-melt thermoplastic polyurethane capable of being applied to low temperature adhesion at a temperature of 60° C. or higher, and a polyethylene (PE)-based protective film layer In one aspect, the first adhesive layer of the low-melting adhesive film according to the present invention has a thickness ranging from 5 to 100 μm. In another aspect, the second adhesive layer of the low-melting adhesive film according to the present invention has a thickness ranging from 10 to 100 μm, In another aspect, the second adhesive layer of the low-melting adhesive film according to the present invention includes adipic acid, MDI (methylene diphenyl diiocyanate), 1,4-butanediol and polyol.

In yet another aspect, the second adhesive layer of the low-melting adhesive film according to the present invention includes 7~10 wt % of adipic acid, 10~40 wt % of MDI, 3~13 wt % of 1,4 butanediol and 40~80 wt % of polyol.

In still yet another aspect, the protective film layer of the low-melting adhesive film according to the present invention is made of one or more materials selected from the group consisting of HDPE (high-density polyethylene), MDPE (medium-density polyethylene), LLDPE (linear low-density polyethylene), PP (polypropylene) and LDPE (low-density polyethylene).

In a further aspect, the protective film layer of the low-melting adhesive film according to the present invention includes one or more materials selected from the group consisting of hydroxyethyl amine (oxy ethyl follow amine), polyoxyethylene alkyl amine, lauric diethyl amide, stearic acid monoglyceride and glyceryl stearate as a slip agent.

In another further aspect, the protective film layer of the low-melting adhesive film according to the present invention includes one or more materials selected from the group consisting of silica, talc and calcium carbonate as an anti-blocking agent.

In still another further aspect, the protective film layer of the low-melting adhesive film according to the present invention has a thickness ranging from 10 to 100 μm.

In various other aspects, the present invention provides a sound absorbing and proofing composite carpet manufactured by using a low-melting adhesive film according to the present invention, including a low-melting adhesive film, a carpet fabric including a high-strength felt layer as a lowest layer, and a sound absorbing layer of polyurethane foam, wherein the carpet fabric is adhered to the sound absorbing layer by the low-melting adhesive film and adhesion is achieved by removing the protective film layer of the low-melting adhesive film.

In an aspect, the second adhesive layer of the low-melting adhesive film is adhered to the high-strength felt layer and the first adhesive layer thereof is adhered to the sound absorbing layer, thereby producing an integrated structure of the carpet fabric and sound absorbing layer. In another aspect, the sound absorbing and proofing composite carpet of the present invention is used for vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
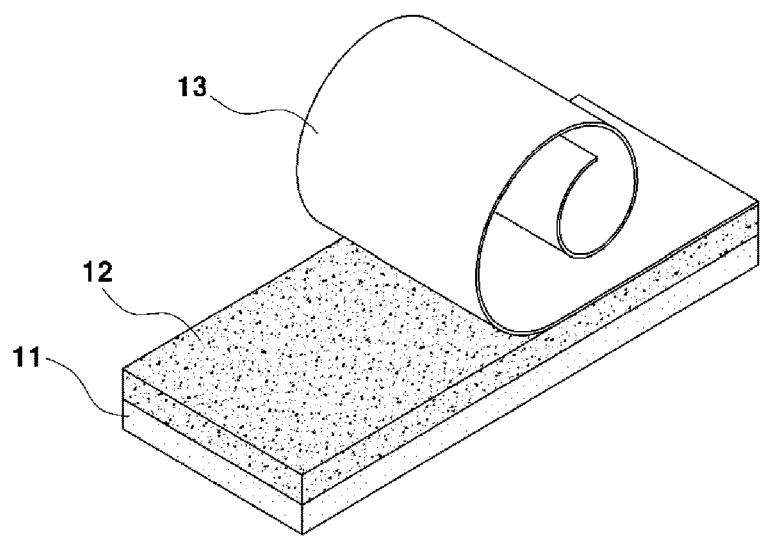
FIG. 1 is a sectional view conceptually showing a structure of an exemplary low-melting adhesive film according to the present invention.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention provides a low-melting adhesive film including a first adhesive layer made of thermoplastic polyurethane or a material comprising thermoplastic polyurethane or the like, a second adhesive layer made of aromatic-based hot-melt thermoplastic polyurethane or a material comprising aromatic-based hot-melt thermoplastic polyurethane or the like, capable of being applied to low temperature adhesion at a lowest temperature of 60° C. or higher, and a polyethylene (PE)-based protective film layer.

Further, the present invention provides a sound absorbing and proofing composite carpet manufactured by using the low-melting adhesive film according to the present invention, in which a carpet fabric including a high-strength felt layer as the lowest layer is adhered to a sound absorbing layer of polyurethane foam by using the low-melting adhesive film, said adhesion being achieved by removing the protective film layer of the low-melting adhesive film.

Hereinafter, the present invention will be described in more detail.

The low-melting adhesive film of the present invention can be applied to or most advantageously applied to a carpet such as a vehicle carpet which is used to impart convenience to vehicles, for example, of improving in appearance and reducing noise, vibration and harshness (NVH). Different from the conventional carpets, in order to fabricate a high-quality carpet in a sound absorbing and proofing composite form having sound proofing properties as well as sound absorbing properties, the lowest layer of a carpet fabric to which the low-melting adhesive film of the present invention is applied is preferably constituted with a high-strength felt which shows excellent sound proofing effects and physical properties and is capable of being smaller and lighter instead of existing AP coatings.

However, since such a high-strength felt cannot be melted even if passing through an oven, it does not show adhesive properties. Thus, different from the conventional AP coatings, the high-strength felt which forms the lowest layer of a carpet fabric should be adhered by melting an adhesive film being bonded to polyurethane foam (which is used as a sound absorbing layer) using latent heat generated from the high-strength felt during the molding process, which makes it possible to fabricate a composite carpet wherein a fabric and an absorbing layer are integrated. However, since the high-strength felt allows the adhesive film to be melted and adhered to the fabric by using the latent heat during the molding process after passing through an oven, the temperature that is actually delivered to the adhesive film is very low (e.g., 70° C. or below). Thus, the high-strength felt cannot be used in the adhesive bonding of a polyethylene film or an olefin film which has a melting temperature of 100° C. or higher and widely used as an adhesive film.

In order to solve such a problem in adhesion which is required for bonding and integrating the sound adsorption layer of polyurethane foam to the carpet fabric into which the high-strength felt is introduced, the present invention advantageously provides a low-melting adhesive film including a first adhesive layer made of thermoplastic polyurethane, a second adhesive layer which is capable of being applied to low temperature adhesion at a lowest temperature of 60° C. or higher, and a protective film layer.

According to the present invention, the first adhesive layer made of thermoplastic polyurethane or a material comprising thermoplastic polyurethane is a part to which a sound absorbing layer of polyurethane foam is adhered. The first adhesive layer has excellent adhesiveness and compatibility to the sound absorbing layer of polyurethane form, and advantageously, acts to prevent a foaming liquid from being leaked due to a temperature and a pressure applied during the adhesion foaming process.

It is possible to integrally or monolithically apply the first adhesive layer with low-melting polyurethane used as a second adhesive layer. Therefore, the first adhesive layer should be composed of thermoplastic polyurethane. If the first adhesive layer is composed of PO or PE rather than polyurethane, there is a problem in that when it forms an adhesive film by using a second adhesive layer described below through co-extrusion, first adhesive layer can be separated from low-melting polyurethane. In this light, because thermoplastic polyurethane is highly compatible to polyurethane foam of the sound absorbing layer, is not separated from low-melting polyurethane thereof and makes it possible to prevent a foaming liquid from leaking, it is preferable in some embodiments to make the first adhesive layer of the present invention out of thermoplastic polyurethane.

The reason why such a first adhesive layer is introduced is because of the following: in the manufacturing process of a low-melting adhesive film, the second adhesive layer as an inner layer of the adhesive film is overlapped at a primary roll, both sides of the resulting overlapped film are cut, thereby separating into two films at a secondary roll. If they are still tacky during this process, the films are adhered to each other at the primary roll, and thus, cannot be separated at the secondary roll, which makes it impossible to carry out a winding process. Thus, in the case that this problem is solved and the low-melting adhesive film is composed of the second adhesive layer only according to the manufacturing process of the present invention, in order to prevent the films from being overlapped at the roll, the first adhesive layer is introduced as an outer layer.

According to the present invention, it is preferable in some embodiments that considering adhesiveness and adhesion durability, the first adhesive layer has a thickness ranging from 5~100 μm.

The second adhesive layer of the present invention is characterized by made of aromatic-based hot-melt thermoplastic polyurethane or a material comprising aromatic-based hot-melt thermoplastic polyurethane capable of being applied to low temperature adhesion at a lowest temperature of 60° C. or higher.

Since the second adhesive layer of the present invention is applied adjacent to a thermal adhesive surface of a polyester fiber high-strength felt, it can be used for the adhesion between a felt layer as the lowest layer of a carpet fabric and the sound absorbing layer of polyurethane foam. Considering the properties of the high-strength felt, the second adhesive layer has preferably a thickness ranging from 10~100 μm.

The second adhesive layer of the present invention is a low-melting polymer which is capable of being applied to low temperature adhesion at a lowest temperature of 60° C. or higher. It is not completely hardened during the manufacturing process of low-melting polyurethane, and thus, is produced in a middle state between a melted resin and a solid. Namely, because of incomplete hardening, it cannot be delivered upward in the manufacturing process, the resin flows down, and thereby, it is impossible to form a film. Therefore, in case of forming a second adhesive layer made of low-melting polyurethane, the first adhesive layer and a carrier film as a protective film layer should be constituted such that they form a layer at both sides of the second adhesive layer, which makes it possible to preferably form the second adhesive layer.

Here, in order to draw the second adhesive layer up on both sides thereof, it is preferable in some embodiments to arrange them at the upper and lower sides of the second adhesive layer.

According to the present invention, aromatic-based low-melting thermoplastic polyurethane which forms the second adhesive layer made of a material preferably including adipic acid (AA), MDI (methylene diphenyl diiocyanate), 1,4 butanediol and polyol (—OH). In particular, it is preferable in some embodiments to use aromatic-based low-melting thermoplastic polyurethane made of a material including 7~10 wt % of adipic acid, 10~40 wt % of MDI, 3~13 wt % of 1,4 butanediol and 40~80 wt % of polyol. More preferably, it is preferable in some embodiments to use aromatic-based low-melting thermoplastic polyurethane made of a material including 7~10 wt % of adipic acid, 10~20 wt % of MDI, 5~10 wt % of 1,4 butanediol and 60~78 wt % of polyol. Because a melting point of low-melting thermoplastic polyurethane is determined depending on the contents of 1,4 butanediol, polyol and adipic acid based on MDI and molecular weights thereof, if it is composed of these ingredients as described above, it is possible to produce low-melting thermoplastic polyurethane having a melting point of 60° C. or lower, more preferably, ranging from 60~80° C.

The polyethylene (PE)-based protective film layer of the present invention acts as a carrier film and has a thickness ranging from 10 to 100 μm, which is advantageous to manufacture a film, to protect a second adhesive layer and to exhibit its releasability. Such a protective film layer can be applied to prevent pollution due to tackyness of a second adhesive layer as low-melting hot-melt resin and to stabilize bubbles for the molding of a film. The protective film layer is a release film being introduced according to the demand for the manufacturing process of a second adhesive layer. In order to bond the carpet fabric and sound absorbing layer (polyurethane foam), this protective film layer is removed by peeling immediately before the low-melting adhesive film of the present invention is adhered to a high-strength felt layer of the carpet fabric, and the first adhesive layer and second adhesive layer are only applied, thereby manufacturing a sound absorbing and proofing composite carpet.

According to some embodiments of the present invention, the protective film layer preferably belongs to polyethylenes, and one or more selected from the group consisting of HDPE (high-density polyethylene), MDPE (medium-density polyethylene), LLDPE (linear low-density polyethylene), PP (polypropylene) and LDPE (low-density polyethylene) can be used. For example, HDPE+LDPE, HDPE+LLDPE+PP, PP+LDPE+HDPE+MDPE+LLDPE and the like can be used.

According to the present invention, it is preferable in some embodiments to use LDPE having a melting point closest to that of the second adhesive layer which is low-melting polyurethane, and other materials can be used as a protective film layer depending on user needs and intended uses.

Also, the protective film layer of the present invention imparts slippery properties to the low-melting adhesive film during the manufacturing process of the present invention, and is formed on the second adhesive layer in order to prevent the film from being adhered to each other during each step of the manufacturing process such as a winding step. At this time, the protective film layer should be smoothly separated from low-melting polyurethane which forms the second adhesive layer. The protective film layer of the present invention can further include one or more selected from the group consisting of hydroxyl ethylamine (oxy ethyl follow amine), polyoxyethylene alkylamine, lauric diethyl amide, stearic acid monoglyceride and glyceryl stearate as a slip agent, and further include one or more selected from the group consisting of silica, talc and calcium carbonate as an anti-blocking agent. Here, in case of using the slip agent, anti-blocking agent or a mixture thereof in the protective film layer, it is preferable in some embodiments to add them such that the total amount thereof corresponds to 2 wt % or less based on the entire amount of the ingredients used in the formation of a protective film layer.

Since the protective film layer is laminated to the second absorbing layer, it functions to prevent the films from being adhered to each other, control pollution due to tackyness and stabilize bubbles for the molding of a film. When the low-melting adhesive film laminated with such a protective film layer is used to manufacture a sound absorbing and proofing composite carpet, the protective film layer should be removed.

As described above, in order to bond and laminate polyurethane foam as a sound absorbing layer to a high strength felt of a carpet fabric, the present invention is characterized by applying the low-melting adhesive film including aromatic-based low-melting thermoplastic polyurethane capable of being applied to low temperature adhesion as a first adhesive layer.

During the manufacturing process of an adhesive film by injecting materials so as to manufacture a low-melting adhesive film of the present invention, the formation of a second adhesive layer is an important step, and hereinafter, it is described in detail as a representative Example.

In order to manufacture a low-melting adhesive film, the step of injecting raw materials can be carried out by using an extrusion molding machine or according to a T-dye extrusion method or the like. Also, as an example, a cylinder can be used to melt the raw materials. It is preferable in some embodiments to use 3-5 cylinders, more preferably four cylinders. In case of using four cylinders, the raw materials are smoothly melted by sequentially increasing the temperature of the cylinders from the first to the fourth. At these cylinders, heat due to the use of a heater and frictional heat are generated. The thus generated heat is transferred to the raw materials filled in a hopper for providing them to the cylinders, and then, the raw materials are adhered due to the heat. When such an adhesion is induced, the raw materials cannot be smoothly injected to the cylinders, and thereby, the formation of bubbles for the manufacture of a film cannot be occurred.

When the raw materials are made into a film, the conventional temperature of the first cylinder ranges from 130 to 170° C., and the heat generated therefrom makes low-melting polyurethane as a second adhesive layer to be adhered. In order to solve the problem caused by such an adhesion, it is possible to decrease the temperature through the circulation of cold air and water into the first cylinder, which results in delaying the time for adhering hot-melt thermoplastic polyurethane used as a raw material for forming a second adhesive layer.

In this regard, the delay in adhesion time point can be achieved by the above method, but it is impossible to completely improve it. Therefore, it is preferable in some embodiments to install a feeder on the hopper while delaying the adhesion time point such that the raw material of a second adhesive layer stays in the hopper only for 10 to 90 min and is rapidly injected to the cylinder. Here, it is preferable in some embodiments to use a feeder which is capable of regulating the injected amount of the raw material for forming a second adhesive layer to that of the raw material for forming a first adhesive layer for a certain period of time through a screw. As such, it is required to regulate the temperature of the first cylinder via cooling so as to prevent the raw materials in the hopper from being adhered. For example, it is possible to regulate the temperature to 130° C. for 10 min or less, 100~130° C. for 20 min or less, 70~100° C. for 40 min or less, 50~70° C. for 60 min or less, 20~50° C. for 90 min or less and the like.

As described above, the low-melting adhesive film of the present invention can be manufactured by forming a second adhesive layer between a first adhesive layer and a protective film layer through the supply of a raw material for forming a second adhesive layer.

FIG. 1 is a cross-sectional view illustrating the structure of a low-melting adhesive film according to the present invention. FIG. 1 shows the structure of a low-melting adhesive film which is comprised of a first adhesive layer (11), a second adhesive layer (12) and a protective film layer (13). Here, the protective film layer (13) is removed when the low-melting adhesive film is used in adhesion.

Meanwhile, the low-melting adhesive film of the present invention can be located between the high-strength felt of a carpet fabric and a sound absorbing layer being introduced to impart sound absorbing properties and acts to laminate the carpet fabric to the sound absorbing layer. In this case, since the protective film layer is removed from the low-melting adhesive film of the present invention, only the first adhesive layer and second adhesive layer are bonded, and thus, it is possible to fabricate a sound absorbing and proofing composite carpet to which sound absorbing properties are imparted. At this time, the bonding process is preferably carried out at a temperature ranging from 60 to 150° C. and a pressure ranging from 1 to 15 kg/cm².

Thus, the present invention includes a sound absorbing and proofing composite carpet in which a carpet fabric including a high-strength felt layer is adhered to a sound absorbing layer by using an adhesive film, wherein the adhesion is achieved by removing a protective film layer of the low-melting film.

According to the present invention, the sound absorbing and proofing composite carpet has an integrated structure where the second adhesive layer is adhered to the high-strength felt layer, and the first adhesive layer is adhered to the sound absorbing layer. In particular, the sound absorbing and proofing composite carpet of the present invention can be advantageously applied as a sound absorbing and proofing carpet for vehicles.

According to the present invention, the second adhesive layer of the low-melting adhesive film can be easily adhered to polyurethane foam used as a sound absorbing layer. However, in the case where the film is melted at a temperature ranging from 60 to 80° C. or higher and under pressure, a burst phenomenon is occurred, and a foaming liquid is leaked from a foaming product of polyurethane foam which forms a sound absorbing layer. Therefore, considering physical properties of polyurethane foam used as a sound absorbing layer so as to solve such a problem, it is preferable in some embodiments to form a first adsorbing layer with a thermoplastic polyurethane resin which is not melted at 130° C. and has a good affinity to a second adsorbing layer, and to fabricate a sound absorbing and proofing composite carpet in a structure where the first adsorbing layer is adhered to the sound absorbing layer.

Also, since low-melting urethane which forms a second adhesive layer has extremely high tacky properties, it is difficult to produce alone. After the second adhesive layer is formed, low-melting urethane is still tacky even at a temperature ranging from 60 to 80° C., which makes it difficult to handle due to a clustering phenomenon with other parts during the loading. Thus, it is need to form a protective film layer so as to prevent these problems. The protective film layer can be formed as a carrier film useful for the formation of bubbles and having no affinity to low-melting polyurethane of the second adhesive layer. When used, the second adhesive layer is directly adhered to the high-strength felt layer of a carpet fabric by removing the protective film layer, which results in manufacturing a sound absorbing and proofing composite carpet.

Figure 2:
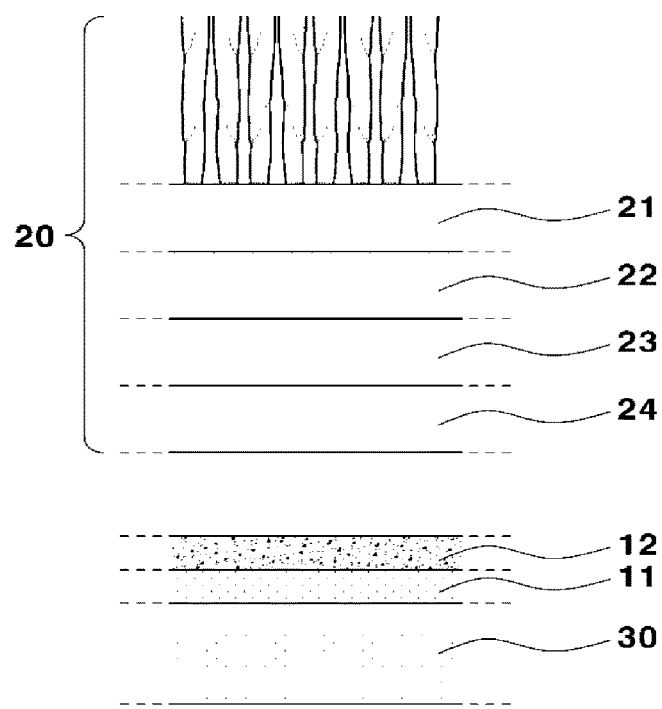
FIG. 2 is a sectional view conceptually showing a structure of an exemplary sound absorbing and proofing composite carpet according to the present invention where a sound absorbing material is adhered to a carpet fabric having a high-strength felt layer by using an exemplary low-melting adhesive film of the present invention.

FIG. 2 is a cross-sectional view of a sound absorbing and proofing composite carpet illustrating the structure in which a sound absorbing layer is adhered to a carpet fabric including a high-strength felt layer by using the low-melting adhesive film of the present invention. By way of illustration, FIG. 2 shows the cross-sectional structure where the first adhesive layer (11) of the adhesive film illustrated in FIG. 1 is adhered to be adjacent to a sound absorbing layer (30), and a second adhesive layer (12) is adhered to be adjacent to a high-strength felt layer (24) so as to adhere a sound absorbing layer (30) to a carpet fabric (20) which is composed of a latex layer (21), a polyethylene resin layer (22), an AP coating layer (23) and a high-strength felt layer (24).

As such, the low-melting adhesive film of the present invention has an advantageous structure which is suitable to be applied to a sound absorbing and proofing composite carpet as an adhesive agent. Further, since it can be produced to show sound absorbing properties as well as sound proofing properties, the low-melting adhesive film of the present invention can be effectively used as an adhesive film. The low-melting adhesive film of the present invention can be preferably applied to the manufacture of various laminated sheet goods with a similar structure and properties to the carpet.

In particular, since when a sound absorbing and proofing composite carpet is manufactured by using the low-melting adhesive film of the present invention, it can show sound absorbing properties as well as sound proofing properties, its reduction effect on noise, vibration and harshness (NVH) is excellent, and there are several advantages such as the production of a high quality product, lightening thereof and cost reduction.

In fact, when a sound absorbing and proofing composite carpet is manufactured by using the low-melting adhesive film of the present invention, it is possible to simultaneous adhesion during the molding of a carpet, which results in improving productivity and reducing production costs by about 50%. Further, because of the reduction of weights caused by an excessive application of hot-melt, there is a lightening effect in which the weight can be reduced by about 55% or more.

The low-melting adhesive film of the present invention can be effectively used as an adhesive film to adhere a sound absorbing layer to a carpet fabric and integrated them during the manufacture of a sound absorbing and proofing composite carpet. In particular, it is very useful as adhesive film for the manufacture of a carpet for vehicles.

Also, the low-melting adhesive film of the present invention can be advantageously applied to the manufacture of various laminated sheet goods with a similar structure and properties to the carpet.

EXAMPLES

The following examples illustrate the invention and are not intended to limit the same.

Example 1

A low-melting adhesive film made of a first adhesive layer, a second adhesive layer and a protective film layer was manufactured. Here, a thermoplastic polyurethane resin film having a thickness of 70 μm was used as a first adhesive layer, aromatic low-melting urethane having a thickness of 60 μm and made of a material including MDI, 1,4-BD, polyol and adipic acid (AA) was used as a second adhesive layer, and a LDPE (low-density polyethylene) film having a thickness of 30 μm was used as a protective film layer. The aromatic low-melting urethane was made of the ingredients having composition and physical properties as indicated in Table 1 below.

Comparative Examples 1~3

Adhesive films were manufactured according to the same conditions as described in the above Example 1 except that a first adhesive layer was formed to include the ingredients and to have the physical properties as described in Table 1 below.

TABLE 1

| Item | Comparative Example 1 | Comparative Example 2 | Comparative Example 3 | Example 1 |
|---|---|---|---|---|
| Ingredients of a second adhesive layer | Normal urethane | Thermoplastic low-melting urethane | Thermoplastic low-melting urethane | Aromatic low-melting urethane |
| Polyol (wt %) | 50 | 60 | 65 | 75 |
| AA (wt %) | 4 | 4 | 6 | 8 |
| MDI (wt %) | 35 | 25 | 20 | 10 |
| 1,4-butanediol (wt %) | 11 | 11 | 9 | 7 |
| Melting point (° C.) | — | 90 | 65 | 60 |
| Average molecular weight (KDa) | 150 | 100 | 80 | 50 |
| Results of carpet application | Peeling (NG) | Peeling (NG) | No abnormality detected at $1^{st}$-$3^{rd}$ rounds (peeling was detected at the $4^{th}$ round) | No abnormality detected |

Test Example 1

Adhesion temperature of the adhesive films manufactured in Example 1 and Comparative Examples 1-3 as described above was measured through a hot-press adhesion test, and the results are shown in Table 2 below.

As shown in Table 2, because the low-melting adhesive film of Example 1 had a low-melting point compared with the adhesive films of Comparative Examples 1-3, its adhesion temperature at the same period of time was relatively low, which makes it possible to economically adhere.

Test Example 2

Each of the low-melting adhesive film of Example 1 and the adhesive films of Comparative Examples 1-3 was applied to the adhesion of a sound absorbing layer of polyurethane foam to a carpet fabric having a high-strength felt as the lowest layer, to thereby manufacture a carpet. The thus carpet was subjected to a molding test so as to examine its performance as an adhesive film.

The carpet fabric used in this Test Example was comprised of a latex layer (100 g/m2), a polyethylene resin layer (400 g/m2), an AP coating layer (500 g/m2) and a high-strength felt layer (500 g/m2). The surface temperature of the carpet before the pressurization was set to 115~125° C., which was equally maintained for each product.

In each product, the first adhesive layer was located adjacent to the sound absorbing layer, the second adhesive layer was located adjacent to the high-strength felt layer, and then, they were compressed, to thereby manufacture a sound absorbing and proofing composite carpet. The results are shown in Table 3 below.

TABLE 2

| Item | Existing product | Comparative Example 1 | Comparative Example 2 | Comparative Example 3 | Example 1 |
|---|---|---|---|---|---|
| Raw material of a second adhesive layer | Polyethylene (single structure) | Normal urethane | Thermoplastic low-melting urethane | Thermoplastic low-melting urethane | Aromatic low-melting urethane |
| Melting point (° C.) | 100-120 | 108 | 90 | 65 | 60 |
| Period of time to which pressure is applied | 25 sec | 25 sec | 25 sec | 25 sec | 25 sec |
| Adhesion temperature (° C.) | 125 | 110 | 100 | 70 | 65 |

TABLE 3

| Item | Existing product | Comparative Example 1 | Comparative Example 2 | Comparative Example 3 | Example 1 |
|---|---|---|---|---|---|
| Material of a second adhesive layer | Polyethylene (single structure) | Normal urethane | Thermoplastic low-melting urethane | Thermoplastic low-melting urethane | Aromatic low-melting urethane |
| Melting point (° C.) | 100-120 | 108 | 90 | 65 | 60 |
| Period of time to which pressure is applied (sec) | 35-50 | 35-50 | 35-50 | 35-50 | 35-50 |
| Molding result | Peeling (NG) | Peeling (NG) | Peeling (NG) | No abnormality detected at 1st-3rd rounds (peeling was detected at the 4th round) | No abnormality detected |

As can be seen in Table 3, as a result of repeating the manufacturing process of a carpet by using the sample product several times and examining their physical properties, it has been confirmed that the low-melting adhesive film of Example 1 shows superior results under the same conditions to the adhesive films of Comparative Examples 1-3.

In addition, as a result of measuring and comparing the weight of each carpet sample having a same size, the carpet manufactured by using the low-melting adhesive film of Example 1 was 7.6 kg, and that manufactured by using the adhesive film of Comparative Examples 1-3 was 13.8 kg. It has been confirmed from these results that the low-melting adhesive film of the present invention has a lightening effect by about 55%.

For convenience in explanation and accurate definition in the appended claims, the terms "upper" or "lower", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A adhesive film comprising:
   a first adhesive layer made of a material comprising thermoplastic polyurethane;
   a second adhesive layer made of a material comprising aromatic-based hot-melt thermoplastic polyurethane capable of being applied to adhesion at a temperature of 60° C. to 65° C.; and
   a polyethylene (PE)-based protective film layer,
   wherein the second adhesive layer made of the material comprising 7~10 wt % of adipic acid, 10~40 wt % of MDI (methylene diphenyldiiocyanate), 3~13 wt % of 1,4-butanediol and 40~80 wt % of polyol,
   wherein the second adhesive layer is located between the first adhesive layer and the polyethylene(PE)-based protective film layer, and
   wherein the second adhesive layer is melted at a temperature ranging from 65 to 70° C.

2. The adhesive film according to claim 1, wherein the first adhesive layer has a thickness ranging from 5 to 100 μm.

3. The adhesive film according to claim 1, wherein the second adhesive layer has a thickness ranging from 10 to 100 μm.

4. The adhesive film according to claim 1, wherein the protective film layer is made of one or more materials selected from the group consisting of HDPE (high-density polyethylene), MDPE (medium-density polyethylene), LLDPE (linear low-density polyethylene), PP (polypropylene) and LDPE (low-density polyethylene).

5. The adhesive film according to claim 1, wherein the protective film layer comprises one or more materials selected from the group consisting of hydroxyethyl amine (oxy ethyl follow amine), polyoxyethylene alkyl amine, lauric diethyl amide, stearic acid monoglyceride and glyceryl stearate as a slip agent.

6. The adhesive film according to claim 1, wherein the protective film layer comprises one or more materials selected from the group consisting of silica, talc and calcium carbonate as an anti-blocking agent.

7. The adhesive film according to claim 1, wherein the protective film layer has a thickness ranging from 10 to 100 μm.

8. A sound absorbing and proofing composite carpet, comprising:
   the low-melting adhesive film according to claim 1;
   a carpet fabric including a high-strength felt layer as a lowest layer; and
   a sound absorbing layer of polyurethane foam,
   wherein the carpet fabric is adhered to the sound absorbing layer by the low-melting adhesive film and said adhesion is achieved by removing the protective film layer of the low-melting adhesive film.

9. The sound absorbing and proofing composite carpet according to claim 8, wherein the second adhesive layer of the low-melting adhesive film is adhered to the high-strength felt layer and the first adhesive layer thereof is adhered to the sound absorbing layer, thereby producing an integrated structure of the carpet fabric and sound absorbing layer.

10. The sound absorbing and proofing composite carpet according to claim 8, wherein the composite carpet is used for vehicles.

11. A adhesive film comprising:
- a first adhesive layer made of a material comprising thermoplastic polyurethane;
- a second adhesive layer made of a material comprising aromatic-based hot-melt thermoplastic polyurethane capable of being applied to adhesion at a temperature of 65° C.; and
- a polyethylene (PE)-based protective film layer,
- wherein the second adhesive layer made of the material comprising 7~10 wt % of adipic acid, 10~40 wt % of MDI (methylene diphenyldiiocyanate), 3~13 wt % of 1,4-butanediol and 40~80 wt % of polyol,
- wherein the second adhesive layer is located between the first adhesive layer and the polyethylene(PE)-based protective film layer, and
- wherein the second adhesive layer is melted at a lowest temperature of 65° C.

* * * * *